US008896436B1

(12) United States Patent
Morehead

(10) Patent No.: US 8,896,436 B1
(45) Date of Patent: *Nov. 25, 2014

(54) SECURITY ALARM SYSTEMS AND METHODS

(71) Applicant: Robert Bradford Morehead, Evanston, IL (US)

(72) Inventor: Robert Bradford Morehead, Evanston, IL (US)

(73) Assignee: Livewatch Security, LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,765

(22) Filed: Jan. 9, 2014

Related U.S. Application Data

(63) Continuation-in-part of application No. 13/955,334, filed on Jul. 31, 2013.

(51) Int. Cl.
G08B 27/00 (2006.01)
(52) U.S. Cl.
CPC ..................... G08B 27/00 (2013.01)
USPC ......... 340/501; 340/3.1; 340/539.18; 379/37; 379/40; 379/42; 455/404.1; 455/403
(58) Field of Classification Search
None
See application file for complete search history.

(56) References Cited

U.S. PATENT DOCUMENTS

| 6,973,166 | B1* | 12/2005 | Tsumpes | 379/45 |
| 2010/0195810 | A1* | 8/2010 | Mota et al. | 379/167.12 |
| 2012/0157034 | A1* | 6/2012 | Martin et al. | 455/404.1 |
| 2013/0273875 | A1* | 10/2013 | Martin et al. | 455/404.1 |
| 2013/0281044 | A1* | 10/2013 | Smith et al. | 455/404.1 |

* cited by examiner

Primary Examiner — Benjamin C Lee
Assistant Examiner — Rajsheed Black-Childress
(74) Attorney, Agent, or Firm — The Watson IP Group, PLC; Jovan N. Jovanovic; Vladan M. Vasiljevic

(57) ABSTRACT

A method for providing notification of an alarm event to a plurality of individuals and communication therebetween having steps that include: receiving an alarm event signal from an alarm system indicating an alarm event; determining a customer associated with the alarm event; determine a plurality of individuals that are to be contacted based upon the customer that has been determined as being associated with the alarm event; selecting a transmission vector having a corresponding transmission identifier; correspondingly associating the selected transmission identifier with the alarm event; sending an alarm event notification to each of the plurality of individuals utilizing the selected transmission vector; and receiving a response to the notification and automatically associating the same; directing each of the plurality of individuals into a virtual chat room corresponding to the alarm event; and facilitating communication between the individuals within the virtual chat room.

20 Claims, 11 Drawing Sheets

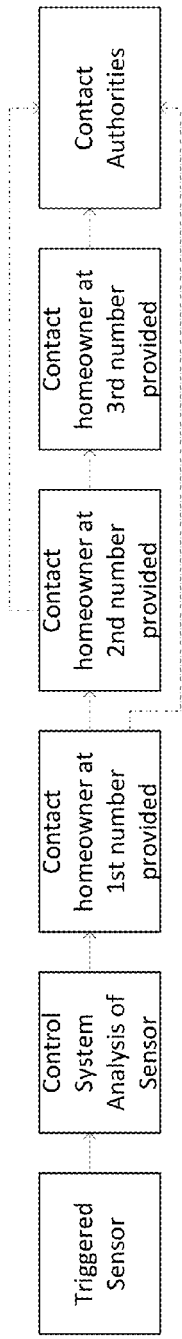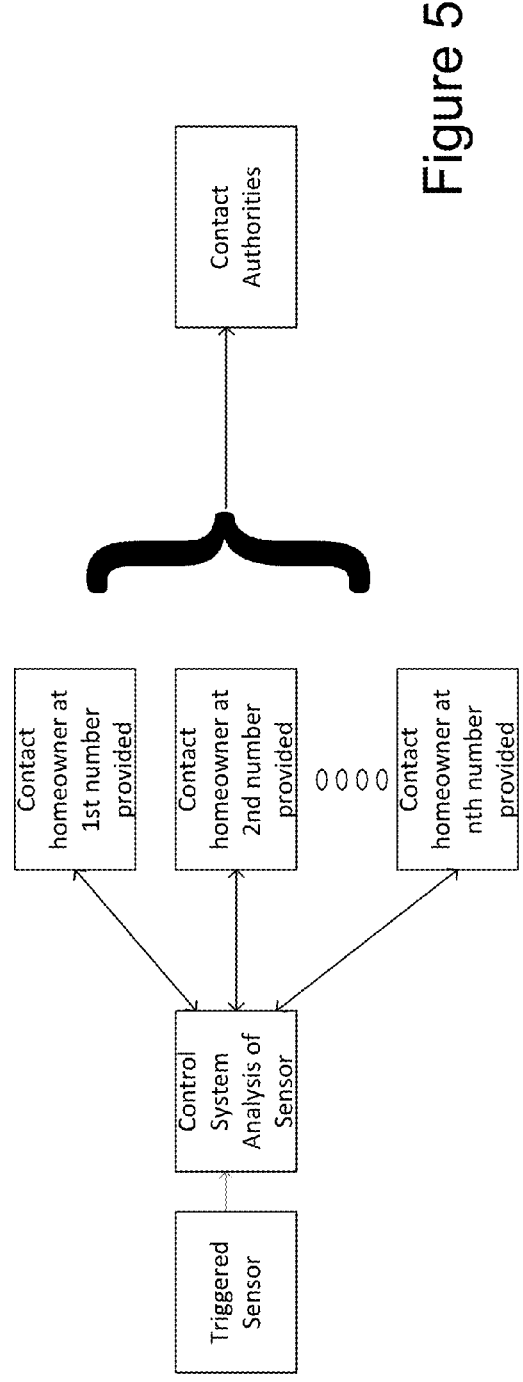

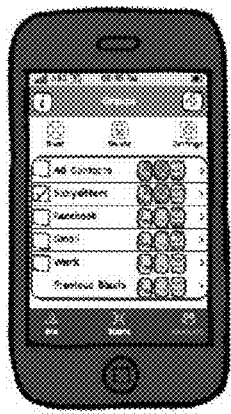 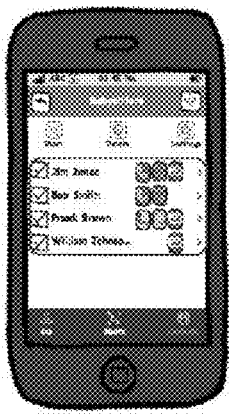 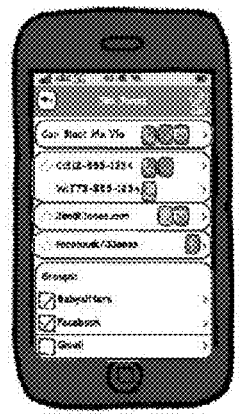
Figure 6a    Figure 6b    Figure 6c
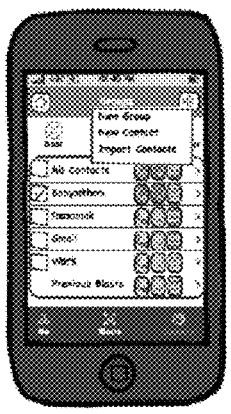 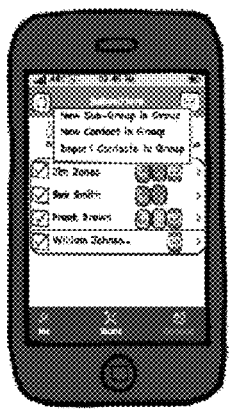 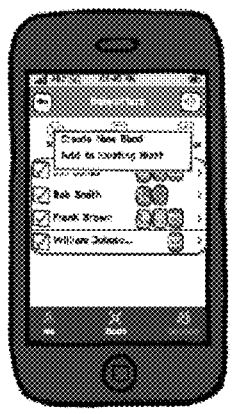
Figure 6d    Figure 6e    Figure 6f

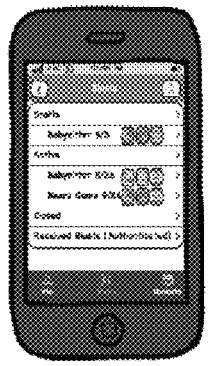
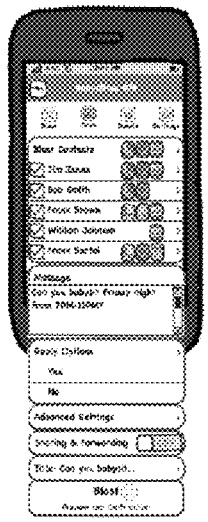
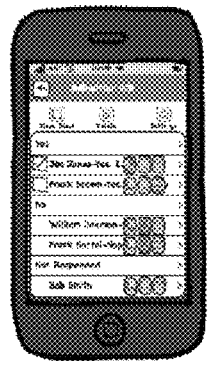
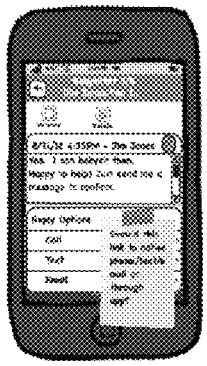
Figure 6g
Figure 6h
Figure 6i
Figure 6j
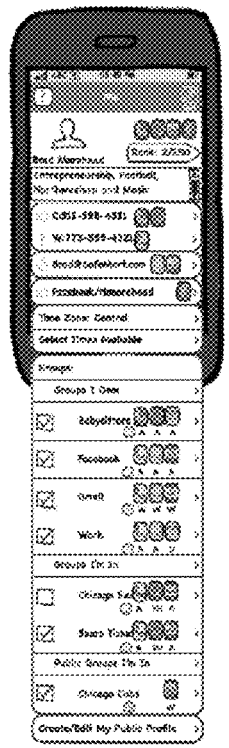
Figure 6k

SECURITY ALARM SYSTEMS AND METHODS

CROSS-REFERENCE TO RELATED APPLICATION

This application is a continuation-in-part application of U.S. patent application Ser. No. 13/955,334 filed Jul. 31, 2013, entitled "Security Alarm Systems And Methods" which claims priority from U.S. Provisional Pat. App. Ser. No. 61/810,741 filed Apr. 11, 2013, entitled "Security Alarm Systems and Methods," U.S. Provisional Pat. App. Ser. No. 61/761,197 filed Feb. 5, 2013, entitled "Security Alarm Systems and Methods," U.S. Provisional Pat. App. Ser. No. 61/698,762 filed Sep. 10, 2012, entitled "Security Alarm Systems and Methods," and U.S. Provisional Pat. App. Ser. No. 61/677,987 filed Jul. 31, 2012, entitled "Security Alarm Systems and Methods." The entire specification of each of the foregoing is hereby incorporated by reference in its entirety.

BACKGROUND OF THE DISCLOSURE

1. Field of the Disclosure

The disclosure relates in general to alarm systems, and more particularly, to alarm systems that are configured for use in homes or offices. The alarm systems of the present disclosure include a number of innovative features which improve the user experience and customization of the system. Among other innovations are included the manner in which alarm events and communication between a central monitoring station and homeowners and other contact individuals.

2. Background Art

The use of alarm systems is well known in the art. Typically, an alarm system is a customized or customizable set of sub-assemblies that are professionally or homeowner installed. In the past, alarm systems would include a plurality of sensors and a control module to which the sensors would be coupled. Generally, the control module would be connected to an outside telephone line (or a cellular service line). In the event of a security issue, the control module would, through the telephone line contact a call center or the local police and/or fire department automatically.

With the advent of more sophisticated electronics, a plurality of new sensors are commercially available, and functionality of the control modules has increased. In many instances, the control modules can be coupled to internal and external networks, allowing for remote programming and remote access. In addition, a number of the different available sensors can provide feedback as to the status of the home, which status can be remotely provided.

Despite the improvements with connectivity, security systems have been slow to leverage such connectivity or to improve service capabilities. For example, it would be advantageous to enhance the security system services and methods of operation to enhance customer experience and leverage increased connectivity. Additionally, it would be advantageous to leverage the user's contacts, service providers, neighborhood/community groups and other relevant contacts so as to enhance the response time of the system in the event of an alarm (which system is applicable to industries other than those associated with alarm systems). Additionally, it would be advantageous to improve communication means and methods between a central monitoring station and homeowners, account holders, contact individuals and the like. It would also be advantageous to provide a single unique telephone number (or communication number) to the user, such that all communication occurs to and from that phone number (and corresponding text number, email address, etc.).

Typically, when an alarm is triggered at a home, an office or the like, an alarm event is transmitted to a central monitoring station. The central monitoring station has a sequential list of individuals that are contacted in a particular order in an effort to discern details pertaining to the alarm, and to determine as to what, if any, emergency services or non-emergency services are required.

Most typically, the central monitoring station attempts to call the premises of the monitored location or the first person on the list. If the first person does not respond, then a message is left, if possible. The second person on the list is then called, and the process is repeated for each one of the individuals on the list. As time is of the essence, typically, a list rarely comprises more than five individuals, and each is contacted sequentially, and generally if contact with the preceding individual was unsuccessful. If no one is reached, or if one of the individuals identify that outside help is required, the central monitoring station contacts outside personnel (i.e., typically emergency services or non-emergency services, fire, police, etc.).

Such a scenario is problematic for multiple reasons. First, the sequential calling of each individual on the list is time consuming. Time is not a luxury where the alarm event is a real occurrence and emergency services are required. Second, there is often confusion and further time delays as an earlier contacted individual calls back the central monitoring station (after receiving, for example, a voice mail). The central monitoring station must first route the call to a proper agent that is prepared to discuss the alarm event, and, the sequential calling of the individuals on the list needs to potentially be stopped as an individual has returned a call to the central monitoring station. The interaction between the agent, the alarm event, the individuals and the return callers often results in time being wasted. Each moment of wasted time can be quite damaging where the dispatching of emergency services is the proper course of action for a particular alarm event.

Additionally, it would be helpful if the different individuals and third parties could communicate in a forum, such as a virtual chat room with each other so as to resolve an alarm event in an expeditious manner through such communication.

SUMMARY OF THE DISCLOSURE

In a first aspect of the disclosure, the disclosure is directed to one or more computer storage media comprising computer-executable instructions for providing notification of an alarm event to a plurality of individuals and communication therebetween. The computer-executable instructions when executed by a computing device performing steps comprising: receiving an alarm event signal from an alarm system indicative of an alarm event out of a plurality of possible alarm events; determining a customer associated with the alarm event; determine a plurality of individuals that are to be contacted based upon the customer that has been determined as being associated with the alarm event; selecting a transmission vector having a corresponding transmission identifier from a plurality of available transmission vectors each having a corresponding transmission identifier; correspondingly associating the selected transmission identifier with the alarm event; sending an alarm event notification to each of the plurality of individuals utilizing the selected transmission vector; awaiting and receiving a response to the alarm event notification on the selected transmission vector and automatically associating information of the alarm event with the response based on the response being received on the selected transmission vector which has been correspondingly associated with the alarm event; directing each of the plurality of individuals into a virtual chat room corresponding to the alarm event; and facilitating communication between the plurality of individuals within the virtual chat room, to, in turn, facilitate the resolution of the alarm event.

In a preferred embodiment, the step of facilitating communication further includes instructions for performing steps comprising providing each of the plurality of individuals an indication as to the ones of the plurality of individuals that have been placed within the virtual chat room.

In another preferred embodiment, the step of facilitating communication further includes instructions for performing steps comprising: providing each of the plurality of individuals an indication as to the identity of each of the plurality of individuals to which the alarm event notification has been sent.

In yet another preferred embodiment, the step of facilitating communication between the plurality of individuals within the virtual chat room further includes instructions for performing steps comprising: recognizing an indication from at least one of the plurality of individuals confirming at least one of an emergency and a false alarm; placing at least one third party into the virtual chat room; and facilitating communication between the plurality of individuals and the at least one third party.

In another preferred embodiment, the at least one third party comprises at least one of a central station agent, security service, a 911 center, emergency first responder, and a plumber.

In some such preferred embodiments, the step of facilitating communication between the plurality of individuals and the at least one third party further includes instructions for performing steps comprising: initiating communication between at least one of the plurality of individuals and at least one third party through a second communication other than within the virtual chat room. Preferably, the second communication comprises a telephone communication, such as a conference call or the like.

In another preferred embodiment, the step of sending an alarm event notification may comprise any one of telephone communication, instant messaging communication, texting communication and email communication.

In another aspect of the disclosure, the disclosure is directed to a method of providing notification of an alarm event to a plurality of individuals and communication therebetween comprising the steps of: receiving an alarm event signal from an alarm system indicative of an alarm event out of a plurality of possible alarm events; determining a customer associated with the alarm event; determine a plurality of individuals that are to be contacted based upon the customer that has been determined as being associated with the alarm event; selecting a transmission vector having a corresponding transmission identifier from a plurality of available transmission vectors each having a corresponding transmission identifier; correspondingly associating the selected transmission identifier with the alarm event; sending an alarm event notification to each of the plurality of individuals the at least one individual utilizing the selected transmission vector; awaiting and receiving a response to the alarm event notification on the selected transmission vector and automatically associating information of the alarm event with the response based on the response being received on the selected transmission vector which has been correspondingly associated with the alarm event; directing each of the plurality of individuals into a virtual chat room corresponding to the alarm event; and facilitating communication between the plurality of individuals within the virtual chat room, to, in turn, facilitate the resolution of the alarm event.

In a preferred embodiment, the step of facilitating communication further comprises the step of: providing each of the plurality of individuals an indication as to the ones of the plurality of individuals that have been placed within the virtual chat room.

In another preferred embodiment, the step of facilitating communication further includes the steps of providing each of the plurality of individuals an indication as to the identity of each of the plurality of individuals to which the alarm event notification has been sent.

In another preferred embodiment, the step of facilitating communication between the plurality of individuals within the virtual chat room further includes the steps of recognizing an indication from at least one of the plurality of individuals confirming at least one of an emergency and a false alarm; placing at least one third party into the virtual chat room; and facilitating communication between the plurality of individuals and the at least one third party. In some such preferred embodiment, the at least one third party comprises at least one of a central station agent, security service, a 911 center, emergency first responder, and a plumber.

In another preferred embodiment, the step of facilitating communication between the plurality of individuals and the at least one third party further includes the step of: initiating communication between at least one of the plurality of individuals and at least one third party through a second communication other than within the virtual chat room. Preferably, the second communication comprises a telephone communication.

In another preferred embodiment, the step of sending an alarm event notification may comprise any one of telephone communication, instant messaging communication, texting communication and email communication.

In another aspect of the present disclosure the disclosure is directed to an alarm operational system. The alarm operational system comprises an alarm system, a central monitoring station control system. The alarm system is positioned at a first location. The alarm system having a control module, a communication module coupled to the control module and at least one sensor coupled to the control module and configured to be triggered upon sensing a predetermined condition. The communication module configured to transmit an alarm event signal when the at least one sensor is triggered. The central monitoring station control system is located at a second location remote from the first location. The central monitoring station is positionable in communication with the communication module so as to receive the transmitted alarm event signal from the alarm system indicative of an alarm event out of a plurality of possible alarm events. The central monitoring station includes a determination component, a selection component, an associating component, a receiving component, a directing component and a communication component. The deter determination component facilitates determining a customer associated with the received alarm event and for determining at least a plurality of individuals that are to be contacted based upon the customer that has been determined as being associated with the alarm event. The selection component facilitates selecting a transmission vector having a corresponding transmission identifier from a plurality of available transmission vectors each having a corresponding transmission identifier. The associating component is configured to correspondingly associating the selected transmission identifier with the alarm event. The sending component facilitates sending an alarm event notification to the plurality of individuals utilizing the selected transmission vector. The a receiving component facilitates awaiting and receiving a response to the alarm event notification on the selected transmission vector and automatically associates information of the alarm event with the response based on the response being received on the selected transmission vector which has been correspondingly associated with the alarm event. The directing component facilitates directing each of the plurality of individuals into a virtual chat room corresponding to the alarm event. The communication component facilitates communication between the plurality of individuals within the virtual chat room, to, in turn, facilitate the resolution of the alarm event.

In a preferred embodiment, the alarm system includes a plurality of sensors, each of the sensors coupled to the control module.

In another preferred embodiment, central monitoring station control system further includes a second communication component for initiating communication between at least one of the plurality of individuals and at least one third party through a second communication other than within the virtual chat room.

In such a preferred embodiment, preferably, the at least one third party comprises at least one of a central station agent, security service, a 911 center, emergency first responder, and a plumber.

BRIEF DESCRIPTION OF THE DRAWINGS

The disclosure will now be described with reference to the drawings wherein:

FIG. 4 of the drawings is a schematic representation of the manner in which conventional systems process an alarm;

FIG. 5 of the drawings is a schematic representation of the manner in which the alarm system of the present disclosure processes an alarm, in one aspect of the disclosure;

FIGS. 6a through 6k of the drawings are a collection of screen shots of one aspect of the system of the present disclosure, showing, in part, the use of an aspect of the disclosure outside of the arena of alarm systems (although the particular aspect of the disclosure has equal applicability within the field of alarm systems);

FIGS. 7 through 15 of the drawings comprise various screen shots of an embodiment of the system in operation, showing in particular, control of the system through a smartphone or the like;

DETAILED DESCRIPTION OF THE DISCLOSURE

Figure 1:
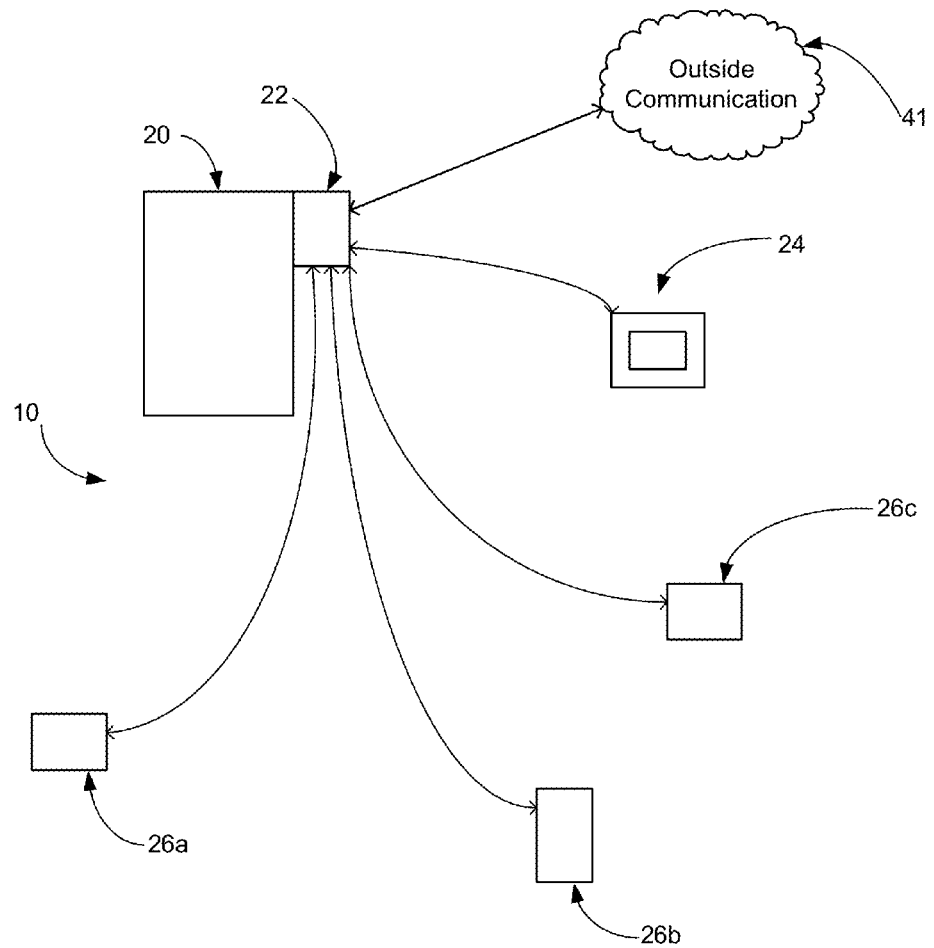
FIG. 1 of the drawings is a schematic representation of the alarm system of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the methods and systems are configured to work in association with an alarm system, such as alarm system 10. A typical alarm system includes a number of different components which work together. Of course, variations to the basic components, or combinations of the separate components are contemplated. Indeed, certain alarm systems may separate some of the components described below into discrete units, or may couple multiple components into a single component. However, it will be understood that typical alarm systems incorporate many if not all of the components that are identified.

Among the components the typical alarm system 10 is shown as comprising control module 20, communication module 22, programming module 24 and sensors (typically, multiple discrete sensors, such as sensors 26a-26c). Generally, the control module 20 is positioned at or near the utility panel in a home or office setting, where it is accessible and also where other utility connections are present. It will be understood that the system 10 is operated under electrical power which can come from a standard plug being supplied AC (i.e., 110v, 60 Hz; 220V, 50 Hz, among others). It will also be understood that the system may be powered by a battery or may include a standby batter that can supply power to the system in the event that AC power has been disrupted. In other embodiments, the battery may be the only source, wherein the battery is recharged through any number of different means, including, but not limited to generators, wind towers and solar cells, among others. Indeed, with security systems, multiple redundancies may be incorporated to minimize successful sabotage.

The control module is essentially a computing device, as are the various computers and controllers which communicate with the control module 20, though outside communication 41. It will be understood that although not required, aspects of the descriptions below will be provided in the general context of computer-executable instructions, such as program modules, being executed by a computing device, namely the control module 20 along with other remote computing devices through outside communication. More specifically, aspects of the description below will reference acts, methods and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to a specialized security system control module (which may be highly proprietary), a conventional server computing racks or conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Figure 3:
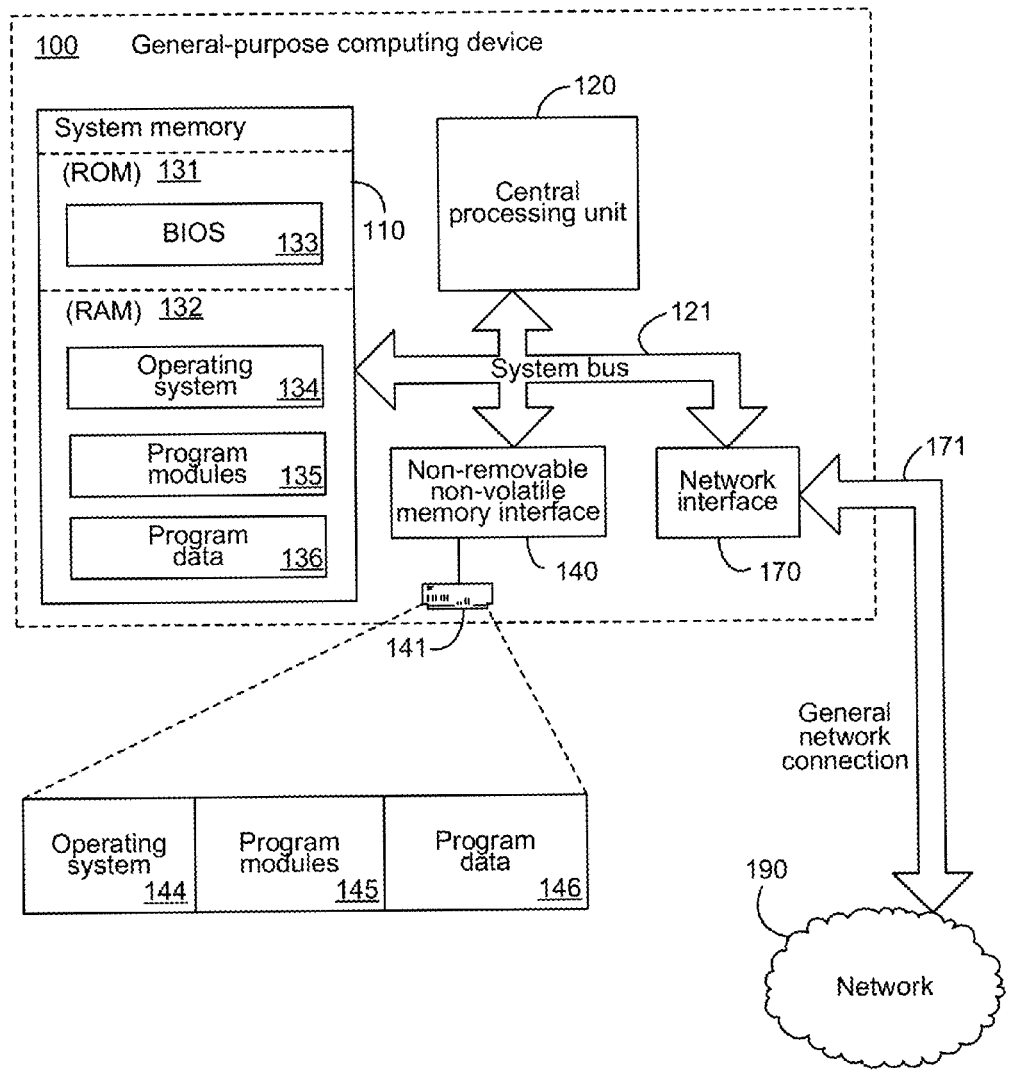
FIG. 3 of the drawings is a schematic representation of a computing device, a version of which may comprise the control module.
Figure 7:
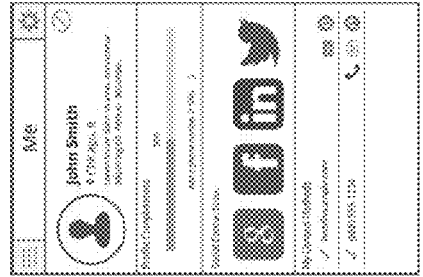
Figure 8:
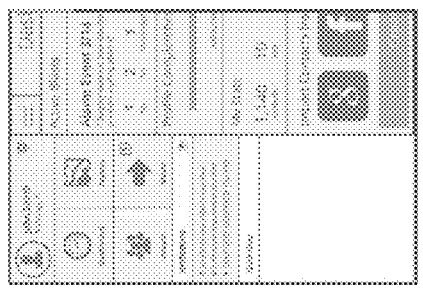

With reference to FIG. 3, an exemplary general-purpose computing device is illustrated in the form of the exemplary general-purpose computing device 100. The general-purpose computing device 100 may be of the type utilized for the control module 20 (FIG. 1) as well as the other computing devices with which control module 20 may communicate through outside communication 41 (FIG. 1). As such, it will be described with the understanding that variations can be made thereto. The exemplary general-purpose computing device 100 can include, but is not limited to, one or more central processing units (CPUs) 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the general-purpose computing device 100 can be physically co-located, such as on a single chip. In such a case, some or all of the system bus 121 can be nothing more than communicational pathways within a single chip structure and its illustration in FIG. 3 can be nothing more than notational convenience for the purpose of illustration.

The general-purpose computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 100. Computer storage media does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 100 may operate in a networked environment via logical connections to one or more remote computers. The logical connection depicted in FIG. 1 is a general network connection 171 to the network 190, which can be a local area network (LAN), a wide area network (WAN) such as the Internet, or other networks. The computing device 100 is connected to the general network connection 171 through a network interface or adapter 170 that is, in turn, connected to the system bus 121. In a networked environment, program modules depicted relative to the general-purpose computing device 100, or portions or peripherals thereof, may be stored in the memory of one or more other computing devices that are communicatively coupled to the general-purpose computing device 100 through the general network connection 171. It will be appreciated that the network connections shown are exemplary and other means of establishing a communications link between computing devices may be used.

The general-purpose computing device 100 may also include other removable/non-removable, volatile/nonvolatile computer storage media. By way of example only, FIG. 1 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 3, provide storage of computer readable instructions, data structures, program modules and other data for the general-purpose computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

With reference to FIG. 1, again, the foregoing description applies to the control module 20, as well as to any other computing devices in communication with the control module 20 through outside communication 41. The control module 20 is coupled to the communication module 22. The communication module 22 facilitates outside communication in the form of voice and/or data. For example, the communication module may include a connection to a POTS line, or a VOIP line for voice communication. In addition, the communication module may be configured to couple into an existing network, through wireless protocols (Bluetooth, 802.11a, ac, b, g, n, 802.15.4, or the like) or through wired (Ethernet, or the like) connections, or through other more generic network connections. In still other configurations, a cellular link can be provided for both voice and data (i.e., GSM, CDMA or other, utilizing 2G, 3G, and/or 4G data structures and the like). The communication module is not limited to any particular protocol or type of communication. It is, however, preferred that the communication module be configured to transmit data bi-directionally, through at least one mode of communication. The more robust the structure of communication, the more manners in which to avoid a failure or a sabotage with respect to communication in an emergency.

The programming module 24 comprises a user interface which can configure the system. In many instances, the programming module 24 comprises a keypad with display that is connected through a wired connection with the control module 20. Of course, with the different communication protocols associated with the communication module 22, the programming module 24 may comprise a wireless device that communicates with the control module 20 through a wireless communication protocol (i.e., proprietary communication, Zigbee, Bluetooth, RF, WIFI, etc.). In other embodiments, the programming module 24 may comprise a virtual programming module in the form of software that is on, for example, a smartphone, in communication with the communication module 22. In still other embodiments, such a virtual programming module may be located in the cloud (or web based), with access thereto through any number of different computing devices. Advantageously, with such a configuration, a user may be able to communicate with the security system remotely, with the ability to change functionality.

A plurality of sensors 26a through 26c can be coupled to the control module in either a wired or wireless configuration. It will be understood that the sensors are shown schematically as being coupled to the communication module with a line having arrows at both ends; such a configuration signifies a communication link, which may be wired or wireless. The sensors, for example, may include typically known sensors used in association with security systems. For example, a motion sensor may be employed in certain areas. Such motion sensors are well known in the art. Other types of sensors include glass breaking sensors, door and window sensors (contact closure switches), light sensors, occupancy sensors, perimeter sensors, temperature sensors. Other sensors, such as temperature, pressure, smoke, water leak, carbon monoxide sensors and the like may also comprise sensors for purposes of the present disclosure. Indeed, there is no limit to the different sensors that can be utilized with the system. Additionally, cameras may be employed and coupled to the control module as another type of sensor under the present disclosure.

Figure 2:
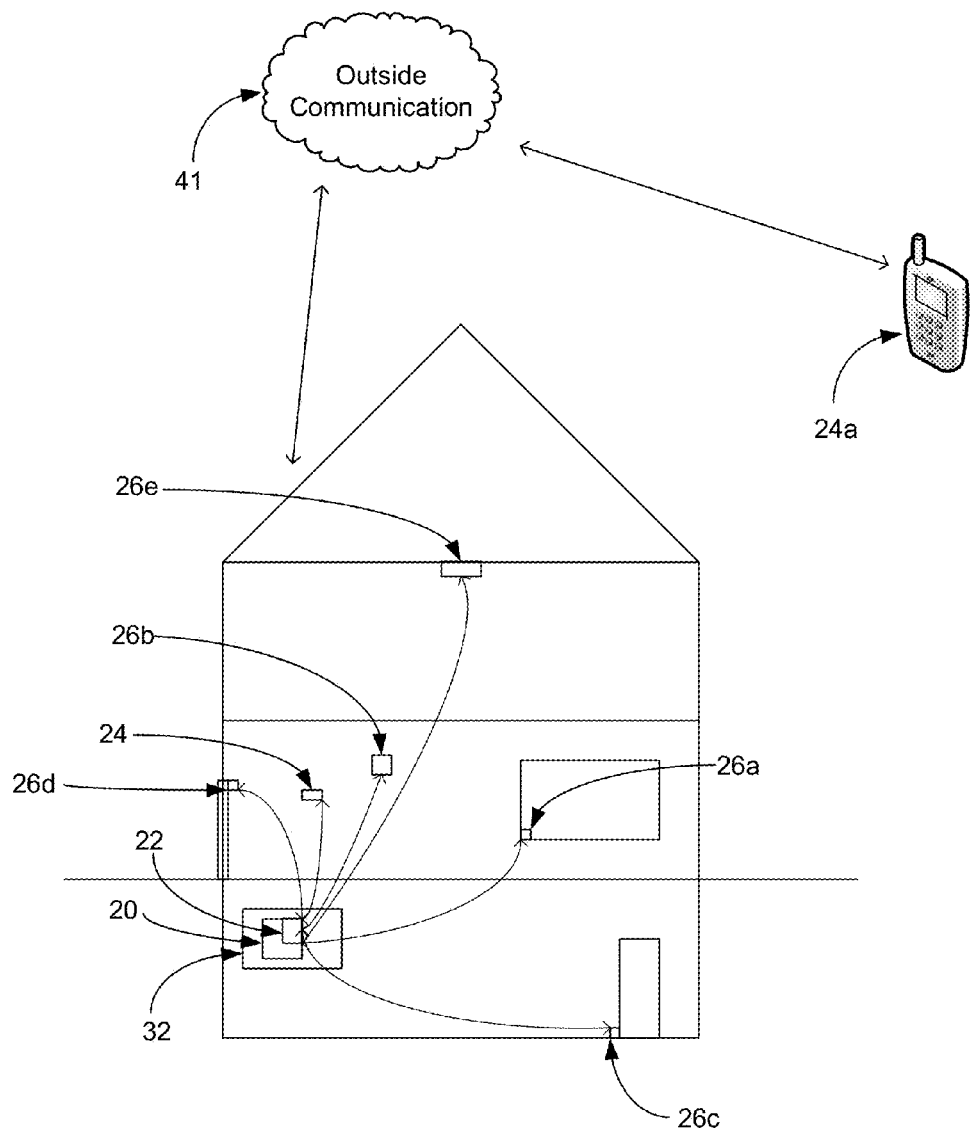
FIG. 2 of the drawings is a schematic representation of the alarm system of the present disclosure installed within a building structure.

With the basic architecture of the alarm system disclosed above, reference is directed to FIG. 2, which discloses a typical installation. The typical installation is disclosed with the understanding that any number of different configurations and installations may be employed. Additionally, it will be understood that the particular described installation is only exemplary and is not deemed to be limiting. Of course, a limitless amount of variations are contemplated.

With continued reference to FIG. 2, a typical installation is shown within a home. Such a typical installation includes the control module 20 being attached to a fixed structure (such as a utility panel 32 in, for example, a basement utility area). The control module 20 is energized through a conventional AC power supply (which may be internal or external). There is provided an additional battery back-up in the event of a power failure or the like.

The communication module 22 is electronically coupled to the control module. The communication module 22 is often mounted within the same assembly as the control module, and may include any number of different communication protocols, as set forth above. Most commonly, a cellular communication, coupled with a network connection (wired or wireless) is contemplated. As such, communication with the control module can be accomplished through any one of those communication protocols remotely. Additionally, when necessary to communicate with the security monitoring company, the police department, the fire department, or other agencies, the communication module 22 provides the requisite hardware to effectuate such communication. Furthermore, the communication module provides the requisite hardware to communicate with some of the wireless sensors that may be utilized throughout the installation.

In the particular embodiment, a programming module 24 is positioned remote from the control module 20 within the installation. More specifically, the programming module is located on the main floor of the home in the exemplary configuration. Additionally, the programming module, in this instance, is hard wired to the control module and can control the functionality of the control module 20. Additionally, another programming module 24 is shown on smartphone 24a which communicates with the control module 20 through outside communication 41 (i.e., the Internet). With such a smartphone programming module 24a, the user can remotely program the control module from the smartphone, using a web interface or a dedicated program on the smartphone. Of course, other computing devices can also communicate with the control module remotely, and the use of a smartphone is for exemplary purposes only.

A plurality of sensors 26 are provided within the home. In the present example, a glass break sensor 26a is positioned on or near one of the glass windows on the main floor of the home. Additionally, a motion sensor 26b is positioned in a central location on the first floor of the home. Further, a water sensor 26c is positioned proximate the water heater in the basement of the home. A door contact sensor 26d is associated with the front entry door. A smoke detector sensor 26e is positioned centrally within the home. Of course, a number of other sensors can likewise be positioned throughout the home; the sensors shown are merely exemplary of some of the sensors that can be positioned within a home.

Conventionally, a tripping or activation of anyone of these sensors can cause the system contact the central monitoring station (i.e., the security system provider call center) and/or local authorities. For example, should any one of the sensors 26a, 26b, 26d be triggered or activated, security systems generally contact the central monitoring station which then determines the appropriate individual, organization or group to call, including, but not limited to the homeowner, the business operator, individuals that are designated by the homeowner or business operator, the police department, the fire department, or an ambulance service. Thus, calls generally proceed through the central monitoring station, wherein the call center agent decides the appropriate action.

Significantly, with the connectivity of the present system through the communication module 22, substantial additional and unique functionality can be provided. To leverage other data sources, the system can be configured to allow the user (homeowner, business operator, account holder, etc.) to connect the alarm system control module with the user's social network account. For example, the system can be placed into communication with a user's social network (such as Facebook, Twitter, Google+ and the like). Through such connectivity, the user has access to his or her friends and contacts within the social network and can use this data to, for example, prepare a call list in the event of a security issue. The user can select individuals from the social network, and the order of those individuals, that the user would like to be contacted in the event that there is a security issue at his or her home. The user can select multiple individuals to be contacted simultaneously, or, alternatively, can sequentially contact individuals only if individuals higher on the list have not responded or received the message. As the social network includes the data for many of the contacts of the user, the system can leverage the information that is already present in the user's social network.

Furthermore, the user can also tailor call lists based on the security issue at the home, which, in turn, is based on the sensor that is triggered or activated. For example, if the water sensor 26c is tripped, the user can set up a call list that, for example, first calls a close friend or neighbor that can very quickly access the problem, if that friend or neighbor is home. The second individual in the call list can, for example, be a local HVAC service provider that the user utilizes for HVAC maintenance and issued. The third individual in the call list may be a relative (i.e., mother, father, brother, in-law) that can address the issue in the absence of the user. On the other hand, if the smoke detector sensor is triggered, the user may wish to have each of the individuals that reside at the home on the call list to insure the location of each member of the household, and to insure that each of the residents is aware of a security issue. Through the programming module 24, the user can create, deploy or otherwise modify call lists based on the triggering of different sensors.

Further still, the data obtained relative to each of the individuals on the call lists can be utilized to send out targeted welcome packages to the individuals. Through the social network, a plethora of data can be obtained relative to each individual selected to be on a call list. Such welcome packages can be sent through traditional mail or through email formats. The packages provide information relative to the user, that the user has placed the individual on the call list, and information as to what the individual can expect in the event of a security issue. Finally, the welcome package can also provide a means by which to offer security services to the individual as well. The offer is then targeted to an individual that is directly affected by the services offered by the security service provider.

In addition, based on the sensor that is triggered, the system provider can sell advertising space to potential first alert responders that may be required later by the homeowner based on the security issue. For example, the system provider can contract with a glass repair shop in any particular locale to send an email, text message or the like to a user (sometimes referred to herein as the homeowner) whose glass break sensor has been triggered, at a predetermined time period after the alarm has been triggered. Thus, the homeowner will have advertisement, and contact information for a company whose services may be urgently needed.

As another example, the system provider can contract with a service company (ServPro®, Certipro®, Servicemaster®, etc.) specializing in damage repair in a particular locale to send an email, text message or the like to a homeowner indicating a specialization in home cleanup where flooding or other disasters have occurred, in the event that the water alarm is triggered. The advertisement provides a very targeted audience, that it, individuals or homeowners that have experienced a flood or other damage. The same service company can purchase advertising to be sent to homeowners that have had a fire alarm trigger, indicating that there may be some fire or smoke damage to his or her home.

In addition to service providers that can facilitate clean up or corrective measures in response to the triggering or activation of an alarm, there are also benefits to certain other types of providers that wish to target a particular audience. For example, the activation of a fire alarm to a homeowner can trigger advertisement from any number of providers of goods and services. As another example, a kennel can send advertising offering, for example, discounts for pet boarding, or a hotel can send advertising offering, for example, an extended stay discount or the like. There is no limit to the type of advertisers that can take advantage of the data obtained relative to the activation of certain alarms within the home.

The manner in which the advertisements are administered can be varied depending on the geographic area as well as other factors. For example, there can be a system wherein the advertiser is guaranteed to have an email sent out in at least a predetermined percentage of situations where the alarm that would trigger the email has itself been tripped or activated. In other instances, the advertiser can be guaranteed that a certain number of email advertisements are sent out over a given period of time. In still other situations, the geographic area serviced by a service provider can be broken into smaller sub-areas, and a different formula for advertising to each sub-area can be designated. Indeed, there is no particular limit to the different manners in which the advertising can be directed to the appropriate homeowner. Of course, a homeowner may also have the option of blocking any advertisements, allowing certain types of advertisements, or allowing any types of advertisements.

It will be understood that each of the above features can be implemented through the computing device described above, or through a network of the computing devices, working in concert with the alarm system which is contained in the home. The implementation is achieved through the writing of code and the execution of same on the computing device to achieve the different methods and features explained herein. One of skill in the art having the present disclosure before him would understand how such features and methods are implemented through the use of a computing device and the execution of written code.

Through the connectivity with the alarm system, a number of advantages can be seen. In addition, to leveraging the information from social media as to contacts for the homeowner in the event of disaster, the social media data can provide the security provider with data pertaining to future potential customers. In addition, the data mined from the operation of the alarm system can provide very pertinent information to service providers and the purveyors of different goods so that those businesses can better target and coordinate advertising efforts.

In another aspect of the disclosure, the system takes advantage of the different call lists that have been assembled, and leverages these lists to improve the procedures that occur as a result of a triggering of an alarm. A typical call sequence is shown schematically in FIG. 4, and the call sequence associated with one aspect of the disclosure is shown schematically at FIG. 5.

With reference to FIG. 4, when a sensor is activated, the message is received by the alarm system panel. The alarm system then contacts the central monitoring station typically through a telephone call (cellular, VOIP or POTS, typically). Once received, the central monitoring station contacts the homeowner (or another individual, such as an agent, relative or representative of the homeowner) at as many as three different numbers (or more). These are done sequentially. The central monitoring station agent calls the first number; if there is no response, the agent calls the second number and, if necessary, sequentially, the third number. Finally, if there is no response at any of these numbers, the proper authorities are contacted (i.e., typically, the police, ambulance and/or fire departments). Among other limitations, the systems (typically due to software constraints and time constraints) are limited to no more than three (to at most five) different phone numbers which they call sequentially. One reason that more calls are not placed is due to the timing of each sequential call. For example, generally, each call takes one minute, as does the processing by the central monitoring station and the panels actions to receive the sensor and transmit the data. Thus, prior to calling the police, if each of the three separate telephone numbers of the user are provided, the total elapsed time is in excess of 5-6 minutes. Each minute in such an instance is quite significant.

With reference to FIG. 5, with the system of the present disclosure, once the sensor is triggered, the control module receives the sensor signal, and then decides the appropriate action. If the appropriate action is to contact the central monitoring station, the communication module contacts the central monitoring station with an alarm event. Next, the central monitoring station executes, automatically, simultaneous contact (i.e., contact that occurs in parallel) with as many individuals, all of which details have been provided to the system (a blast of communication). For example, certain individuals on the list are to be contacted through telephone call. Others are to be contacted through email, and still others are to be contacted through text message. It is contemplated that communication methods may include multiple different phone numbers, multiple chat/txt/IM/SMS addresses, multiple Twitter/Facebook/Google+ or other social media, voice (with text-to-speech, interactive voice response (IVR), automated menus, text transcription, among other methods. The blast of communication may include video, audio, multimedia or images, as well as conventional text and the like. Any one of the numerous contacts (all completed simultaneously) can be given a predetermined time to respond (i.e., 1 minute or 2 minutes). If no return communication is received within the prescribed time period (which can be user prescribed), then the central monitoring station can contact the proper authorities. It will be understood that like the outward blast communication, any response communication may include video, audio, multimedia or images as well as conventional text and the like. Once these authorities have been contacted, then, a confirmation message is sent to the same phone numbers, text messages and emails corresponding to those that were sent out previously (essentially informing those that were attempted to be contacted that the authorities have been contacted).

Advantageously, the homeowner can set any number of individuals that can be contacted in parallel (and, it will be understood that a single individual may be contacted in any number of different forms), and a response can be solicited from any one of the users and any one of the messages that have been sent. Again, the user can set the amount of time that one is allowed to respond. As such, in the event that not a single answer is received, and the authorities are contacted, up to two minutes have been saved. Moreover, unlike three sequential contacts, any number of contacts were tried, in any number of different formats/methods (i.e., phone, text, email, etc.). It will also be understood, that, if desired, tiers of users can be contacted (if desired), wherein the messages are sent in waves for any particular desired reason. In addition, it is contemplated that among the contacts are service providers (i.e., plumber for a flood, security guard service, neighbor, neighborhood watch, etc.), depending on the type of sensor that has been triggered.

With it is contemplated that such a system has utility well beyond alarm systems, although the primary embodiment considered is for use in association with such alarm systems. For example, a similar system can be used in the area of offers and acceptances. For example, if one has an item for sale, or requires a service, the user can have desired groups of contacts to which messages are sent (termed a blast). The system can then wait for a response. If a response is received that is acceptable, then a message is sent to the contacts that the offer is withdrawn. In other embodiments, instead of a simple yes or no, there may be an opportunity to make a bid or to counter offer. Additionally, it is contemplated that other responses are contemplated, such as certain predetermined responses that may be predicated by a character combination, such as a hashtag. For example, the user of #yes, #no, #falsealarm, #gunman, #burglar, etc. is contemplated as a response that can be provided which includes quite a bit of information that will help immediately with the dispatching of the appropriate personnel, or the cancellation of the alarm event.

For example, the system can be utilized to sell tickets, to, for example, a baseball game. The system can be configured to send out a message (phone, text, email, tweet, Facebook posting, etc.) with my offer for the tickets (it may be a take it or leave it offer, or an offer to place a bid). Next, the user can configure the individuals (contacts) to which the user would like a message sent. The user can have groups of listings, individual listings, or a combination. The user can then send the message (i.e., blast) to all the contacts at the same time. Alternatively, the user can send out the message in waves.

As responses are received, the system will do the prescribed action which can be provided to the system. For example, the system can accept the first offer that is received (if so configured). Alternatively, the system can receive multiple offers, and prompt the user to accept one of the offers. In another embodiment, the system can operate on a particular algorithm (i.e., provide responses, indicative of a bidding (counter offer) situation), until a predetermined point (where there is only one remaining bidder).

Once the offer has been accepted and finalized, a message can be sent out to everyone to indicate that the offer no longer exists, or that the offer has been accepted by someone other than the contact receiving the message.

Another example would be in the providing of babysitting services, for example. By way of example, the user is awaiting his or her babysitter to watch the user's child. Undesirably, that babysitter has cancelled in the last moment. The user, through the system, can send a single blast to each babysitter in his group of babysitting contacts, under a particular algorithm (i.e., the user may have several tiers of babysitter groups, from, for example, the least expensive to the most expensive, in which case the babysitters are sent messages in tiers). Alternatively, the babysitters can all receive the message at the same time.

The user than allows for a period of time until the message is answered by one of the babysitter contacts, and the offer to babysit is accepted. Once accepted, the user can then send out a message to others confirming that the offer has been accepted.

With reference to FIGS. 6a through 6k, which is a collection of screenshots of a particular user's configuration. As can be seen, the user's contacts are grouped into particular groups. The groups include all contacts, babysitters, Facebook friends, Gmail contacts and work colleagues. These groups are exemplary and a greater number or a fewer number of groups are possible.

Within the groups, the user may specify the manner in which to reach the contact, and the preferred manner of contacting that individual. In addition, within each group, each contact may have a preferred method of contact. The user can review each contact and determine which, if any, particular groups should be associated with that contact. The system can also keep track of any messages that were transmitted to the particular contact, as well as any responses received (so as to provide data pertaining to that contact for future analysis). In addition, the system has the ability to provide a live chat functionality across various protocols and various communication means, all of which can occur in realtime.

In addition, contacts can seek out groups which to join, so as to receive messages. For example, a group may be created that is open for the purchase of tickets for sporting events. A particular user of the system can browse open invitations to join groups, and can select to join a particular group. In such a configuration, the system includes a user screen that the user can manipulate so as to tailor the receipt of different messages from different groups in different manners.

In a further example, which has applicability with the alarm system of the present disclosure, and outside of the alarm system. In the event of a natural disaster (such as an earthquake), a user can utilize such a system to first inform a group of contacts that the user is unharmed (or to specify another condition). The user can then make the "offer" as set forth above, a request for shelter from one of his groups of contacts. The user can then send out a message requesting shelter. When a response is received, and the user accepts the response, the user can transmit a message to the others indicating that shelter has been found. Again, there are great advantages to sending out the messages simultaneously, as desired (although, the contacts can be divided into groups, wherein the groups are contacted sequentially).

In the embodiment of an alarm system, problematically, it is often difficult to provide communication to the alarm customer (and any other designated and/or authorized) individuals. There are two different problems. First, depending on the call center, the customer may receive calls that come from many different locations and different numbers. Thus, even with caller ID, it is difficult for a customer to recognize the number, and, in turn, a call may go to voicemail. Second, with such different calling numbers, it becomes easier for an unauthorized user to trick or otherwise deceive the alarm user or alarm company into divulging information (based on the thought that the unauthorized impersonator, alarm company or user is somehow authorized).

In the present system, it is contemplated that the user is provided with a specific phone number (555-555-1212) that is unique to the single customer. Thus, all communication to that user will come from that number. That is, whenever the alarm system provider contacts the customer, the unique number will be used. For example, on the caller ID, the calling number will appear as 555-555-1212 when calling that user, or any authorized person in their tree, text messages will appear from 555-555-1212, email communication will appear from 555-555-1212@secuirtycompanydomain.com, or email communication through a social network using the number 555-555-1212 as part of the protocol. Significantly, the various communication means are all linked together, such that wherever the communication response comes, (i.e., phone, text, email, social network, etc.), they can be coordinated across the different databases and systems to achieve proper notification to the user, and a rapid response back when the user returns a communication.

When the user receives a message from the alarm company, the user will return communication to the same number (thereby identifying by the direction of the communication, the identity of at least the customer in question). That is, the user/customer calls 555-555-1212 to be connected to the alarm company. With each customer being a unique phone number, the system can automatically understand who is calling and connect that user with the particular agent that is in the best position to help that user/customer. As the communication is received on the unique number, the system can instantaneously retrieve any required information without any further input from the user. Thus, rather than requiring various verification forms, the communication can be transmitted properly instantly. Thus, the user can be conferenced with the security professional that has the relevant information immediately, and without verification delays. Such conferencing can occur via voice, data, WebRTC, among other means of communication. In certain instances, multiple means of simultaneous communication can be implemented.

Additionally, the communication from that user can instantly be routed to the proper location (i.e, group, agent, customer service personnel, etc.). For example, when the user communicates, the unique telephone number is always transmitted as a matter of course. Thus, the recipient of the return communication, without any further information, can discern a substantial amount of information merely from the unique number associated with the response. Furthermore, as each customer (or subscriber, user, etc.) has a unique telephone number (and communication number), that number can be coupled to a particular originating dealer. As such, customization can be made to the different communication methods corresponding to the communication standards for that particular dealer. Thus, even though the call may go to a central location, the number provides not only the identity of the event (which is based on the unique number that the customer is calling) but also information that can be linked to the dealer. Appropriate actions based on dealer can then be put in place.

As a further advantage of the system, if a call or communication is received by the security provider, and the communication is to a general number, or a number other than the unique number of that user, then the security provider can seek further verification to discern whether or not that individual is an authorized user, or someone trying to impersonate the authorized user. In addition, if the correct unique number is dialed, or a communication is received referencing the unique number, but the communication is coming from an unknown location, or from some communication protocol which is not associated with a known or authorized user, then the system can flag the same as a fraudulent call (or a deceptive call). Thus, further information and proof of identity can be required, or, the request from that individual can be deleted or otherwise refused.

It is contemplated in another embodiment of the disclosure that the foregoing unique telephone number is assigned to a particular alarm event (instead of a particular unique customer). That is each alarm event phone call or message would be sent from, for example, a unique number 555-555-1212, 5555551212@alarmco.com, etc. In that manner, a return contact using that particular telephone number from a user would provide information to the central monitoring station as to the pertinent alarm event and also information as to the individual contacting the central monitoring station (through Caller ID, the phone from which a message was sent or an email address from which a message was sent). Thus, the identifiers that are received from a return message or contact from an individual provides both the identification of the individual and the alarm event at the outset. Such a configuration greatly aids the directing of the return message to the appropriate agent within the central monitoring station. The advantage of such a system is that whereas multiple users may have the same contact information (i.e., the main telephone of a business with multiple employees), the phone number that is being contacted represents an alarm event which can then link the individuals with the proper phone number received in the caller ID so as to reach the proper agent.

An implementation of such a system is shown in the diagrams of FIGS. 7 through 15. In particular, such an implementation can be made through a smartphone application (or through another type of implementation such as a computer or the like). Each figure will be described first in terms of the various participants, the level of access that such participants have and the privacy as to those participants. Subsequently, an alarm sequence is described, for exemplary purposes.

Figure 9:
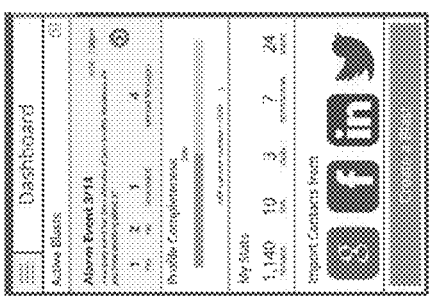

In particular, the system is set up with a particular administrator in mind (i.e., member). The user starts the system, as is shown in FIG. 9 by providing his profile information. Additionally, the user provides different contact methods, such as, for example, email and telephone, etc. In the example shown, John Smith is the user, and that user resides in Chicago. He has provided his social connections so that the system can mine the data for his contacts and assemble lists of his contacts. In addition, the system is configured to review his phone for contacts as well, and provide access to this contact information as well.

In this example, John Smith has provided two different contact methods, one of which is an email address which is configured for receiving email. The other is a telephone number which is configured for both telephone communication and also for SMS (text) communication. It will be understood that additional communication forms may be provided, such as, for example, a pager, other email addresses, other telephone numbers, etc.

Figure 10:
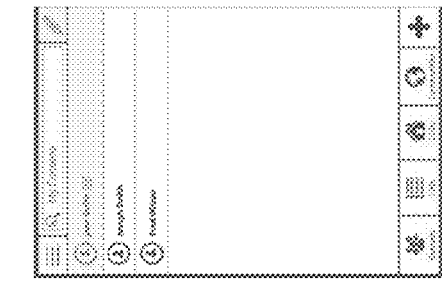

With the profile developed, and the different contacts assimilated from the different sources, as is shown in FIG. 10, a list of contacts can be developed. The user can then select and identify the users as being particular types of contacts, or can assign certain types of communication between the administrator and the contact.

There are different types of communication categories. For example, any contact can be placed into a certain type of grouping. Among other categories of groupings, it is contemplated that a contact may be part of one or more lists, clubs and communities. Each has a different type of interaction with the member, John Smith.

For example, a list is a private grouping of contacts, termed members, that can communicate with John Smith directly in response to a blast or alert from John Smith. A list member, however does not see any response from the other list members, nor is aware of the existence/identification of any other list member. Thus, a blast to a list creates the possibility of several different single conversations between an administrator and a contact on the list. The contacts have no interaction with each other, nor can they communicate with any party other than the administrator.

A club grouping allows for interaction between the different contacts. Each individual that is a member of the club can allowed to extend a blast to the other members, and can see the different responses from the different members of the club. The club is not accessible or visible to contacts that are not members of the club, but within the club, everyone can have the same privileges (with the privileges being authorized by the administrator(s) of the club).

A community is an open group of contacts. Anyone can blast to a member of a community, and there is no restriction on membership. That is, any user can select to be a member of a community, and can receive and send blasts to and from the community. There are other levels or types of groupings that are contemplated, and these are merely for exemplary purposes and not to be deemed as being limiting. It will be understood that any type of grouping can be changed to the next more permissive grouping, as desired. As such, a list can be converted into a club, and a club can be converted into a community. While possible and contemplated to provide more functionality, it is preferred that groupings are converted in one direction (i.e., more permissive) solely.

Figure 11:
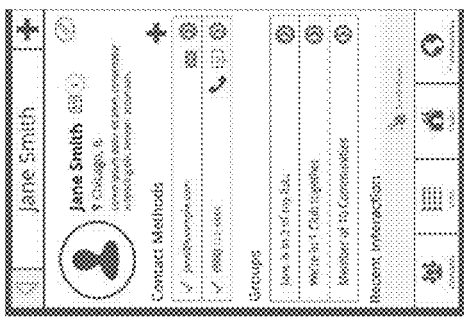

A particular contact may share any number of lists, groups and communities with the particular administrator. With reference to FIG. 11, a contact of John Smith, namely Jane Smith, has provided two different forms of communication. The first is an email address and the second is a phone number. Jane Smith, it is identified shares three lists in common with John Smith, one club, and ten communities. The user can select any one of these commonalties to see further information such as, which lists, communities, or clubs the contact and the administrator share with each other. Additionally, the administrator can have the option to add Jane to other clubs, lists or to join communities of which Jane is a member. Furthermore, the screen identifying this contact can also provide other information, such as, for example, recent interaction, etc.

Within the different groups, there are different levels of members. For each such group, there is at least one administrator that is capable of executing administrative functions. For example, in the case of a list, there is at least one administrator (and generally only one administrator) that can control the members that are a part of the list. Such control includes the control of members, blasts, messages, roles, preferred contact methods, descriptions, among others. Another level member is a member that has blast privileges, commonly termed a blaster within the system. Such a blaster is a member of a club or a community. Such an individual can send and receive blasts, but does not have administrator privileges with respect to other members. Finally, a member is an individual that does not necessarily have a profile, but is a member of a list. Such a member receives blasts when called upon and can provide a response thereto. If an administrator or blaster have made blasts shared or collaborative (as will be described), then the member will be able to see these messages, users and responses.

Additionally, for the different blasts, different levels of privacy can be set, including private, shared and collaborative. A first level comprises a private setting. In such a setting only the blaster can see and contact the different members of the group. In a shared privacy, only a blaster can contact all of the members, but all of the members can see all of the blasts. Finally, in a collaborative privacy setting, all of the members can see each other and send blasts to each other.

Figure 12:
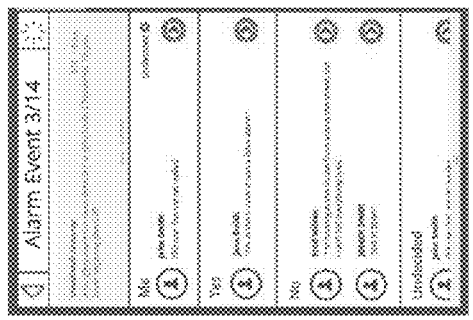

The system will be shown in an example, such as an alert relative to a potential alarm situation at John Smith's residence. With reference to FIG. 12, the administrator, John Smith, has identified a list that includes Jane Smith, Fred Wilson and Joseph Smith as list members. This particular list is the home alarm list of John Smith. That is, each of these contacts is the recipient of a blast sent out in the event that an alarm is triggered at the home of John Smith.

In the particular example, an alarm event on March 14 was triggered at 1:30 pm, and also at 1:35 pm. A message has been sent (i.e., blast) to each of the members of the list, requesting information as to any knowledge relative to the two alarms that have been triggered. In this example, there are essentially multiple administrators, one being John Smith, the other being the alarm company. It will also be understood that, as described above, a particular phone number (email address, identifier, etc.) is assigned to this blast. As such, the communication is being sent from/received by that particular phone number (or other identifier). That is, the communication from the blast is not sent from "John Smith," but rather, preferably, by the central monitoring system of the alarm. Of course, other variations are contemplated, including direct messaging. In that manner, the central monitoring system control the flow of communication between the different parties.

Figure 13:
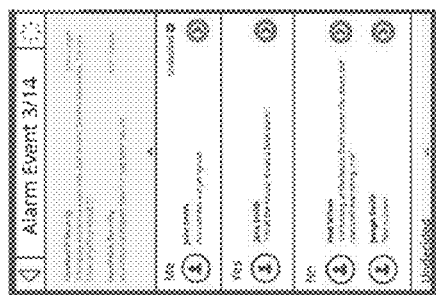
Figure 15:
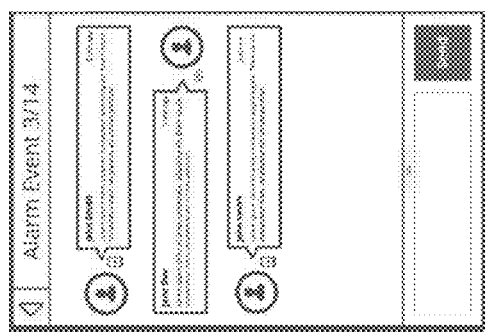

When the blast is sent out to each of the members of the list, as is shown in FIGS. 12 and 13, John Smith, as an administrator, can see both the message transmitted by the alarm system (a single message in FIG. 12, and multiple messages in FIG. 13) as well as the responses received from any of the list members. The information John Smith receives can also be categorized in accordance with the type of response. It will be understood that the central monitoring system can translate any of the messages. That is, while the information appears in text to John Smith, certain recipients may have sent a SMS, an email, a phone call, etc which the system will translate for ease of display to John Smith.

In the present example, different list members have provided different responses. For example, John Smith has not responded to the blast. Jane Smith has provided a response. In particular, Jane has confirmed that the alarm is a false alarm, and that she is in the home (ostensibly, she may have triggered the false alarm). Fred Wilson as also responded. He is a neighbor of John Smith. He has provided a response indicating that he cannot provide any definitive information either that the alarm is a real emergency, or that it is a false alarm. Similarly, Joseph Smith cannot provide any information. To John Smith, he can see from his screen that Jane has responded with information, and that Fred and Joseph have responded with no information.

Rather than send a response himself, John Smith can communicate with Jane Smith (erroneously identified as Jane Doe on this screen) directly. It will be understood that, with reference to FIG. 15, Jane and John exchange communication that is solely between the administrator and the contact. That is, the other members of the list are not a part of the interaction and have no indication of the existence of the contact, nor the communication.

Figure 14:
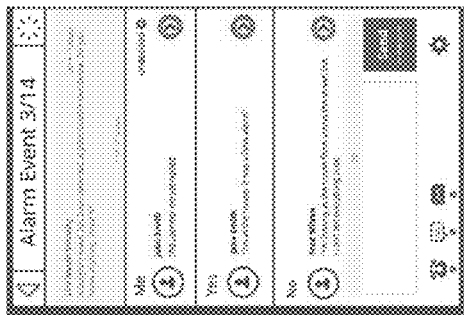

To the contrary, as is shown in FIG. 14, John may choose to send a message to all of the members of the list. Each of the members may provide a response to the communication. Any such communications will appear on John's screen. However, each one of the contacts will be unaware of the other contacts and unaware of any communication with the other contacts.

In another example, instead of an alarm that is associated with a list, John Smith may set up a club of bridge players that play together regularly. In such an example, John Smith sets up a club of his bridge players. He can then send out a blast to those club members. John Smith can also set the desired privacy settings for the club. For example, he can set up the privacy so that none of the club members can add any members to the club, but the members can return a blast or reply to a message from any other member of the club. On the other hand, John Smith can set the privacy so that not only can the club members send out a blast, but the club members can also add further club members and correspond with the further club members. The control of the club member privacy is controlled, in the example cited, by the administrator, John Smith. It will be understood that one or more administrators can be assigned to any club (with the same being true of lists and also communities). It will also be understood that, preferably, the particular blast or communication is assigned a particular phone number (or the particular club or community) such that the communication between the members of the same occur to and from the same particular phone number.

Figure 16:
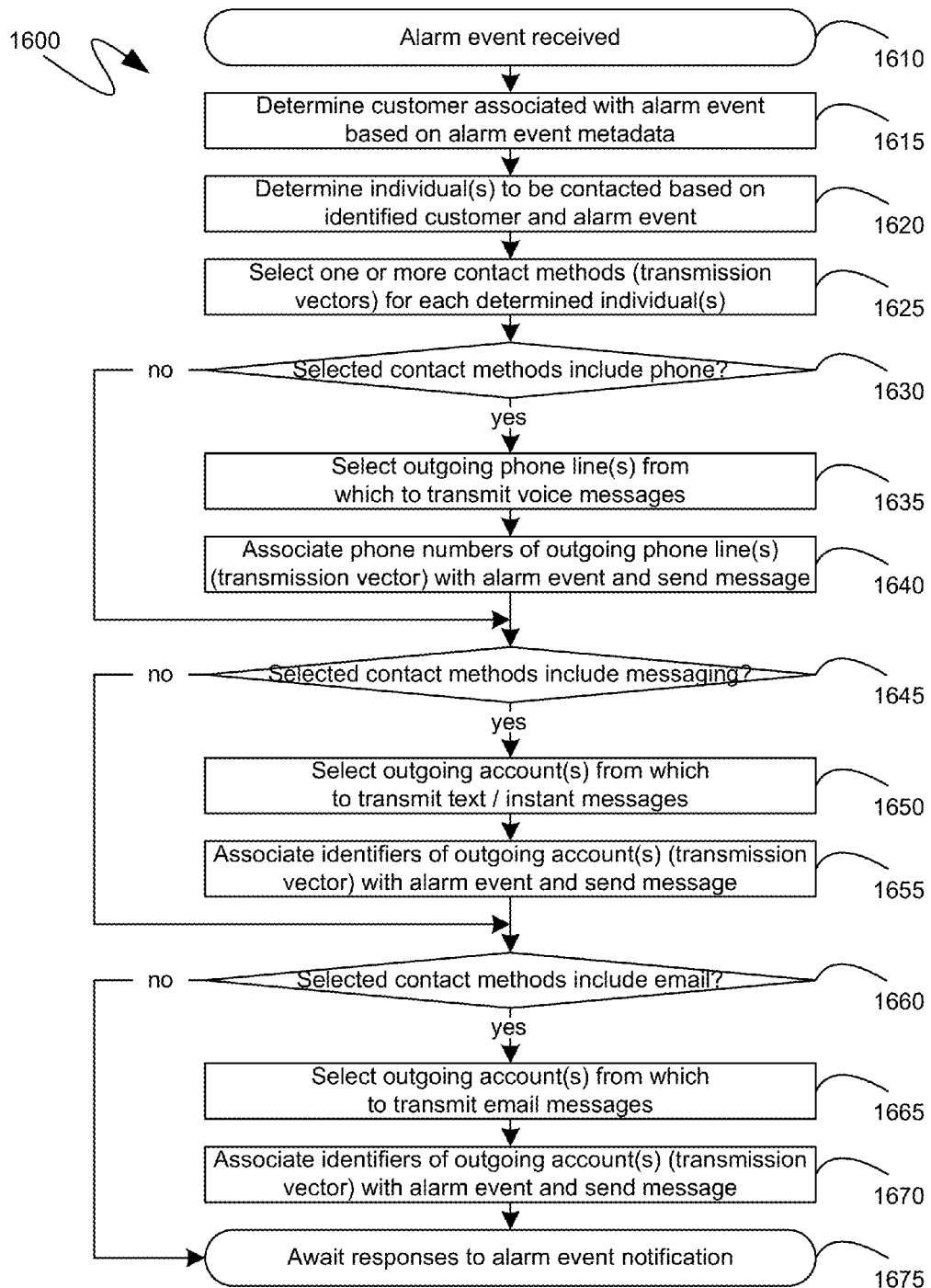
FIG. 16 of the drawings is a flow chart of exemplary steps that are carried out by a central monitoring station or the like in response to an alarm event and the receipt of notification of an alarm event.

With reference to FIG. 16, a typical flow chart is disclosed pertaining which sets forth steps undertaken when an alarm event is received. In particular, an alarm event is received at 1610. The alarm event is typically received from an alarm unit at the home of a customer or place of business through any number of different communication medium. For example, a call (typically using cellular transmission) is generally placed by the alarm system to the central monitoring station providing details of the alarm event. Of course, other manners of transmission are likewise contemplated (wifi, text, email, wireless) without limitation. Once the signal is received, the central monitoring station determines the customer associated with the alarm event based on alarm event metadata at 1615. It will be understood that the data associated with the alarm may be coded or may remain uncoded, and transmits in a format that is recognizable to the central monitoring station the location of the alarm event.

Once the alarm event information received, the central monitoring station determines at 1620 the individual and/or individuals that are to be contacted based upon the customer and the received alarm event. As is generally understood, a particular customer will have one or more contact individuals that are to be contacted in the event that an alarm signal is received from the central monitoring station (and, indeed, there are not limitations on the number of individuals that can be contacted). As set forth above, the individuals that are to be contacted may be generally identified by the customer, and the individuals may be varied depending on the particular alarm event (i.e., flood sensor may have a different contact list than a burglar alarm). It is also contemplated that the different individuals in a contact list can be organized in an order of importance or in an order of significance, among other orders.

At this time, the system can also look to see if there are any other alarm events that pertain to the same emergency. That is, have other alarm events been received from the same system or the same/proximate location which can be merged into a single event or related events.

After determining the contact individual(s) that are to be contacted when the alarm event is received, the central monitoring system determines at 1625 the one or more contact methods for each determined individual(s). In particular, each of the contact individuals may have one or more manners of contact. The manners of contact may include telephone contact, instant messaging/text messaging (which may be through SMS, messaging, social media or the like), or email. Of course, these modes of communication are exemplary and for purposes of illustration with the understanding that other contact methods are likewise contemplated.

It will further be understood that there may different modes of contact through the transmission vectors. For example, for a contact, there may be a multitude of communication vectors, identified above. In one mode, a communication may be sent to all of the different modes of communication, i.e., telephone, instant message/text message, and email, among others. In another mode, the system decides (based on any number of different algorithms) to sequentially send the transmissions, first to the most likely mode of communication, then to the second most likely mode of communication, and so on through the different modes of communication. In such a configuration, the system can wait to send each of the sequential transmissions, so as to wait for a response from the immediately preceding transmissions. In still other embodiments, the system may decide to send it to only one or some of the different modes, after deciding the best or multiple best modes. In yet another embodiment, a single mode may be selected due to the type of communication and the length of the communication, for example.

The foregoing communications may be selected based on the type of message or the type of communication that is to be transmitted. For example, the chosen mode of communication may be derived through the level of urgency. Where there is a high level of urgency, a transmission can be sent through each one of the different modes of communication. Whereas, in a standard level of urgency (i.e., lower than a high level of urgency), a transmission may be sent sequentially to each of the desired modes of communication with a pause therebetween to await a response from the contact. In still other communications, such as lower levels of urgency, a transmission can be sent to what is deemed a best mode of transmission. Where a particularly low level or urgency, or a large amount of low level urgency data is to be transmitted, a transmission mode can be selected which is most capable of handling such a transmission (i.e., an email communication for a particularly long message of low priority). Of course, other variations are likewise contemplated.

It is contemplated that the system can also store and analyze information received from different individuals so as to learn or attempt to discern or decide the modes of communication that are most suitable for a particular individual, as well as other characteristics when responding to an alarm event.

The system then contacts the individuals using the determined contact methods. For example, the central monitoring station determines if any of the selected contact methods include phone communication at 1630. If so, then the central monitoring station selects an outgoing phone line(s) from which to transmit voice messages at 1635. Once the proper phone line(s) have been secured, at 1640, the system can associate phone numbers with outgoing phone line(s) with the alarm event and make the call. In particular, and as set forth above, a particular telephone number (a transmission vector) can be selected from a plurality of telephone numbers and associated with the particular alarm event, such that any call back (response vector) to that particular number immediately connects the caller to the event so that it can be properly routed within the central monitoring station. If no one answers the call, the system can leave a voice message.

In other systems, and also as set for the above, the transmission vector, in this case, the telephone number that is assigned may correspond to a specific telephone number for that particular consumer, or to a particular range of telephone numbers for that particular consumer. Other variations in assigning phone numbers is likewise contemplated.

The central monitoring station determines if the selected contact methods include messaging (which may include any one of instant messaging, text messaging, SMS and the like) at 1645. If so, then the central monitoring station selects an outgoing account (or transmission vector) from which to transmit the messages at 1650. Finally, the central messaging station associates the transmission vector with the alarm event 1655. As set forth above, the same number that has been assigned as the telephone number for the particular alarm event can be the outgoing account for the messages. Thus, when a response is received, as with the phone call, the response will be transmitted to the same unique telephone number that will serve as the identifier for the particular event. Again, the return message (response vector) can be properly routed within the central monitoring station. That is, the unique identifier is essentially embedded within the phone number that has been assigned to the particular alarm event (i.e., the unique identifier is the phone number or the IM/email address)

The central monitoring station determines if the selected contact methods also include email at 1660. In the event that the selected vectors include email, the system selects an outgoing account (transmission vector) from which to transmit email messages at 1665. It will be understood that a transmission vector may comprise the selected phone number@selecteddomain.com, for example. The identifiers of the outgoing account (transmission vector) is then associated with the alarm event and the message is sent out at 1670. The message that is sent out is sent, preferably with the same transmission vector as the telephone number. Thus, when a response vector is received, the identifier will be received and the email can be properly routed within the central monitoring station.

It will be understood that if none of the selected contact methods include a phone, then the steps associated with the selection of a transmission vector and the associating of the transmission vector with the alarm event can be skipped. The same is true in the event that no selected vectors include messaging or include email. It will be understood that the steps are shown sequentially in the drawings for purposes of simplicity and ease in description with the understanding that events that do not rely on a prior step can occur sequentially, simultaneously, or in parallel with each other. Thus, each one of the individuals can be contacted in parallel in multiple manners using the same or different methods of communication.

Once the messages have been sent to the individual(s) through the different manners utilizing the selected transmission vectors, the system awaits responses to the alarm event notification messages at 1675. It will be understood that a particular individual may be sent notifications through multiple means. That is, for any particular individual, multiple phones, messaging address and email addresses may be provided to the central monitoring station. In response to an alarm event, the central monitoring station can select a transmission vector and transmit messages using any one of the manners identified.

Figure 17:
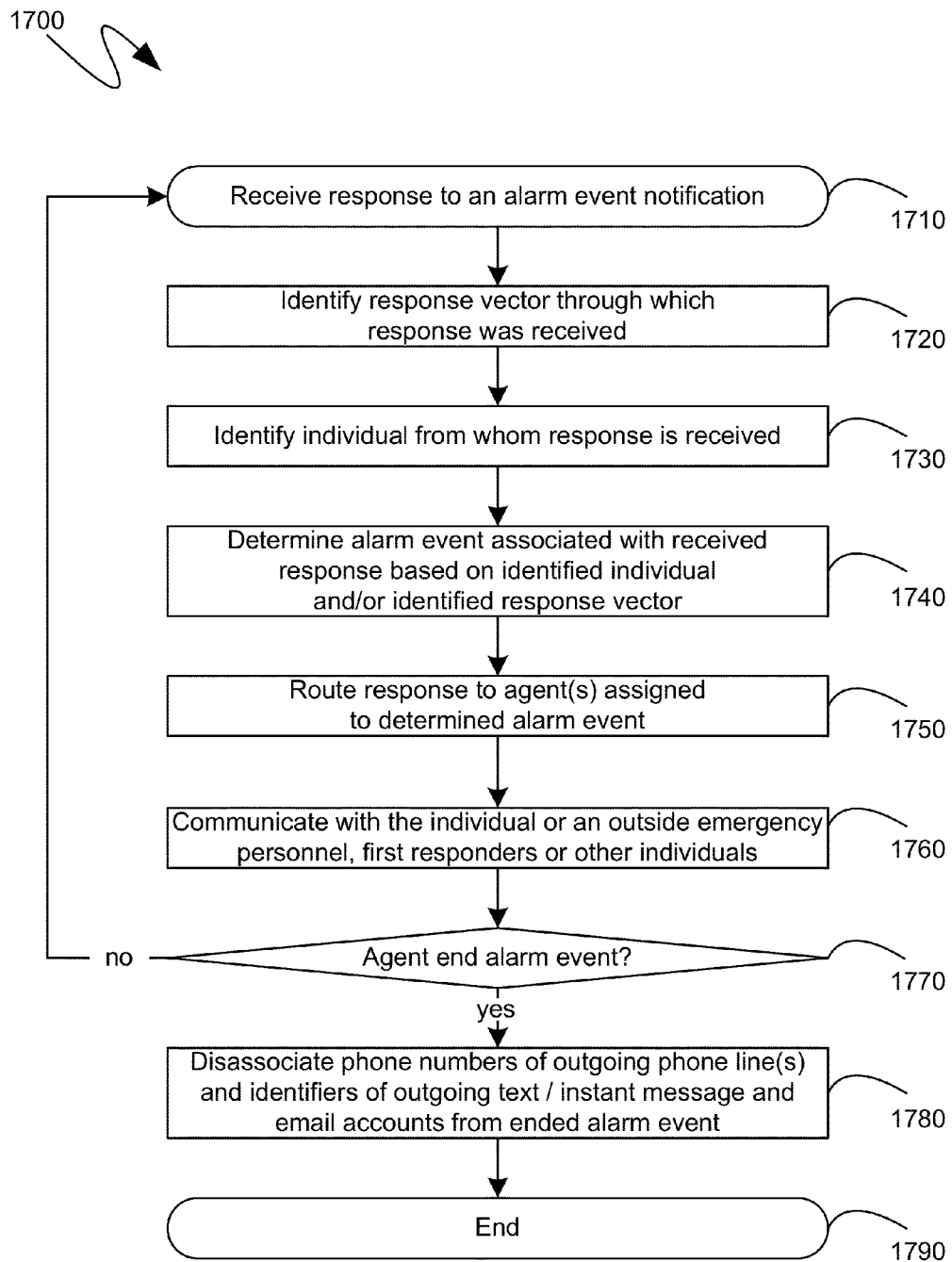
FIG. 17 of the drawings is a flow chart of exemplary steps that are carried out by a central monitoring station or the like when a response has been received from a communication sent to an individual(s) concerning the occurrence of an alarm event.
Figure 18:
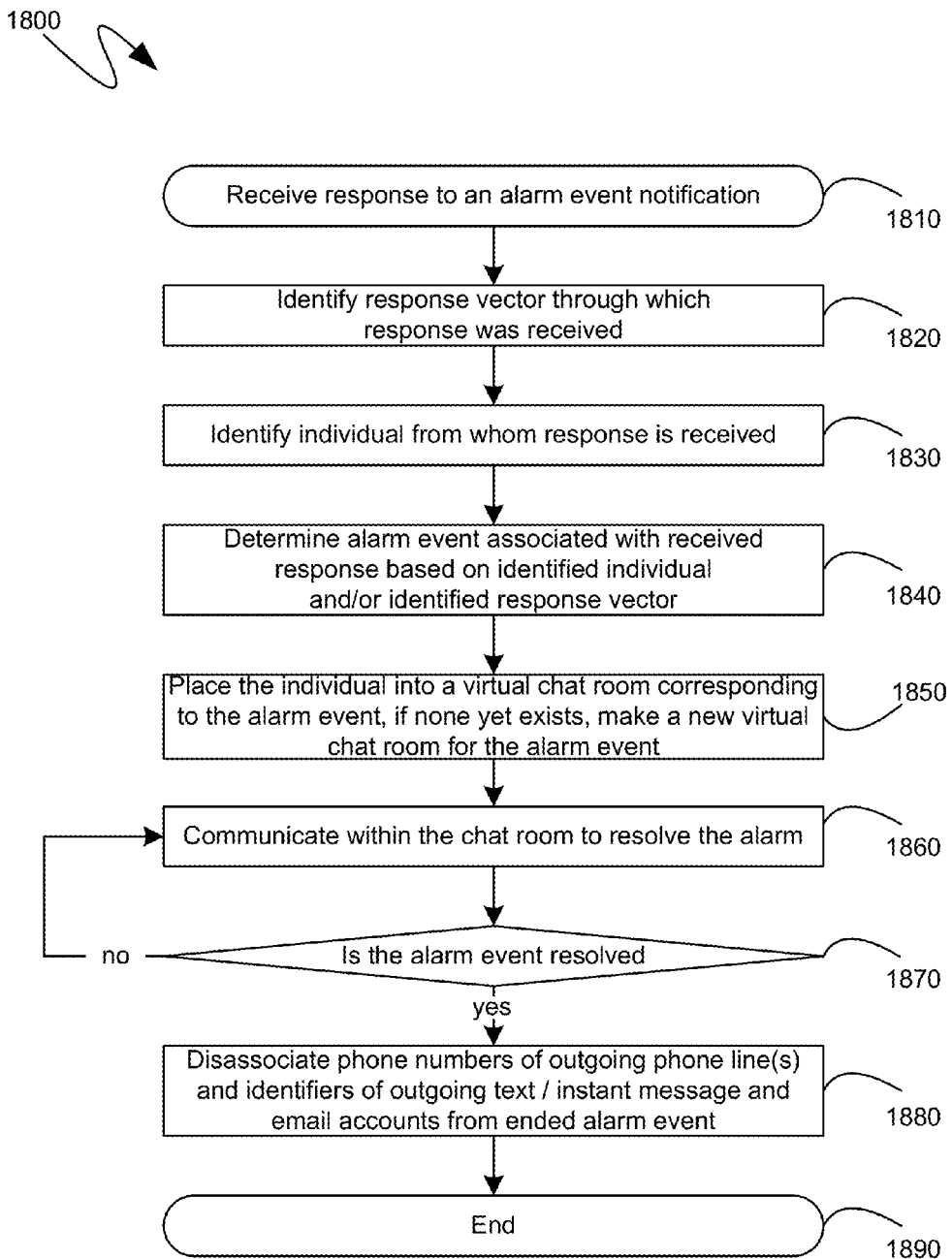
FIG. 18 of the drawings is a flow chart of exemplary steps that are carried out by a central monitoring station or the like in response to an alarm event and the receipt of notification of an alarm event.

With reference to FIG. 17, once the outgoing alarm event notifications are sent, the system is configured to receive responses to the alarm event notifications. When a response is received at 1710, the central monitoring station receives a response vector which has information pertaining to an transmission vector at 1720. The transmission vector, as is explained above, preferably comprises a unique selected transmission vector, such as a unique phone number that is assigned to the particular alarm event.

Additionally, the response vector further includes information as to the individual from whom the response is received at 1730. The individual can be identified based on the telephone, instant message, text or email message information that can be obtained (i.e., caller ID information, text or instant message sender or email sender). Such identification alone may not provide enough information to identify the individual (i.e., if the individual is calling from a payphone, or one number of a large call hunt group of a business). Thus, separate and apart from the actual message or voice of the user, the system has received a response vector in the form of the transmission vector (phone number called, email address the response is sent to, etc.) that provides the information necessary to the central monitoring station to understand the corresponding alarm event.

Once the response vector is received, the central monitoring station can determine the alarm event that is associated with the received response based upon the response vector. That is, the alarm event can be determined based upon the transmission vector (phone number or email address that has been contacted), and perhaps the individual can be determined through the response vector which may include caller ID information, and text and email sender information) at 1740. Upon receipt, the central monitoring station can at 1750 very quickly route the response to the agent associated with the alarm event. In the embodiment described, with the transmission vector corresponding to a phone number, the proper routing can be determined virtually immediately and the routing to the appropriate agent can be completed quickly without requiring any further information from the individual.

Once the agent receives the response, the agent can send another message if desired at 1760. Once a message is sent, the central monitoring station is not ready to end the alarm event and the event remains open. Thus, the agent awaits another response (or further communication by telephone). The agent can also contact and communicate with outside providers, such as emergency personnel, first responders, and the like. Communication can be maintained between the agent and the individual that has responded.

Further responses may be received from other individuals that have been identified and contacted for a particular alarm event. These responses likewise travel through the flow diagram shown in FIG. 17, generally in parallel. It will also be understood that the communication between the central monitoring station and the individual may be copied to or joined by other individuals. For example, the homeowner or other designated individuals can be copied on all communication between central monitoring station and an individual pertaining to an alarm event.

Once the necessary communications have been completed, and any outside authorities have been contacted as necessitated by the alarm event, the agent can determine that the alarm event can be ended at 1750. Once the alarm event has been ended, the selected transmission vector (i.e., phone number, email address, etc.) can be disassociated from the alarm event and returned to a pool of usable transmission vectors. It will be understood that once the alarm event has been ended, the selected transmission vector may be maintained outside of the pool of selectable transmission vectors for a predetermined time to insure that no errant or unintended messages are sent in response to an alarm event that has ended. During such a time, if a response vector is received containing the prior selected transmission vector, the central monitoring station can transmit a communication indicating that the event has been ended. After the passage of the predetermined period of time, the transmission vector can be returned to the pool of available identifiers.

The system at the central monitoring station can be configured to handle multiple simultaneous alarm events and multiple assignments of transmission vectors to an alarm event. For example, it is contemplated that a pool of thousands of telephone numbers are available for selection and use as transmission vectors corresponding to an alarm event. Once the event has ended, the telephone number that was used can be removed from use for a period of as little as a few days to weeks or months, at which time it is returned to the pool of available numbers.

In another embodiment of the disclosure, the manner in which the responses are handled can be through a virtual chat room. Whereas Steps 1810 through 1840 are essentially parallel to steps 1710 through 1740 of FIG. 17, at step 1850, the system places the individual that has responded into a virtual chat room corresponding to the alarm event. The virtual chat room can be set up prior to a response that is received by the system, or with the first individual that responds to the alarm event. It will be understood that the particular time and trigger for the creation of the virtual chat room is not significant, rather that the individual is placed within the chat room that corresponds to the alarm event.

Each other individual that responds to an alarm event is also placed into the virtual chat room. It is contemplated that the chat room may be graphically displayed on a web page or through an application on, for example, a smartphone. Thus, any of the individuals that are a part of the alarm event (i.e., that have responded or to which a communication was transmitted relative to the event) can be identified as participants of the virtual chat room. An indicator can be utilized for each one of the individual of the virtual chat room to identify as to whether each of the individuals are present in the virtual chat room and/or available to correspond. Thus, as participants enter or leave the virtual chat room, the remaining individuals in the virtual chat room are aware of the participants at any given time. Thus, the individuals can communicate with each other in addition to a representative of the central monitoring station so as to resolve the alarm event.

Through dedicated buttons or the like on the graphical representation of the virtual chat room (i.e., through a webpage, or software) on a device, such as a smartphone, that can provide quick status information to the virtual chat room. For example, a button may be available which indicates false alarm to the virtual chat room, as well as a button that indicates emergency or call the appropriate authorities to the virtual chat room. Thus, where an individual has information which resolves the alarm condition (either indicating that it is in fact a real alarm situation, or a false alarm), such information can be transmitted quickly through the single action of the user through the interface. It will be also understood that the display can link the different individuals to the virtual chat room regardless of the mode of communication (that is, the virtual chat room unifies the different modes of communication). Such an action button or the like can be utilized in other embodiments of the invention and not only embodiments that have virtual chat rooms. That is singular communication between the central monitoring station and a single individual (without the ability to have other individuals join) can also benefit from the use of action buttons or the like being provided through a graphical interface that is application based or web based, on, for example, a smart phone or the like.

It is further contemplated, that in the event that an outside third part is necessary to resolve the alarm event, the system can initiate a conference call (i.e., a telephone call) between the individuals in the virtual chat room and the third party, which may include, a central station agent, security service, PSAP (911 center, emergency first responder or other third-party. It is contemplated that the system may also include other service providers such as a plumber for flood emergencies or other types of people that can help for other types of alarm events. It is also contemplated that such a separately initiated call may be by means other than telephonic communication (i.e., a conference communication through other means).

It is also contemplated that the virtual chat room can be set up without the participation of a member of the central monitoring station. That is, the individuals that join the alarm event virtual chat room can attempt to resolve the alarm condition prior to involvement of a member of the central monitoring station. At any time, in the event that there is a resolution requiring an individual from the central monitoring station, or in the event that the authorities are called, their involvement may be sought. As a result, costs savings can be achieved through the resolution of the alarm without involvement of the central monitoring station personnel. As a result, a separate tiered payment structure can be developed that provides for payment according to the different amount of assistance and/or involvement that is required.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. One or more computer storage media comprising computer-executable instructions for providing notification of an alarm event to a plurality of individuals and communication therebetween, the computer-executable instructions when executed by a computing device performing steps comprising:

receiving an alarm event signal from an alarm system indicative of an alarm event out of a plurality of possible alarm events;

determining a customer associated with the alarm event;

determine a plurality of individuals that are to be contacted based upon the customer that has been determined as being associated with the alarm event;

selecting a transmission vector having a corresponding transmission identifier from a plurality of available transmission vectors each having a corresponding transmission identifier;

correspondingly associating the selected transmission identifier with the alarm event;

sending an alarm event notification to each of the plurality of individuals utilizing the selected transmission vector;

awaiting and receiving a response to the alarm event notification on the selected transmission vector and automatically associating information of the alarm event with the response based on the response being received on the selected transmission vector which has been correspondingly associated with the alarm event;

directing each of the plurality of individuals into a virtual chat room corresponding to the alarm event; and facilitating communication between the plurality of individuals within the virtual chat room, to, in turn, facilitate the resolution of the alarm event.

2. The computer storage media of claim 1 wherein the step of facilitating communication further includes instructions for performing steps comprising:

providing each of the plurality of individuals an indication as to the ones of the plurality of individuals that have been placed within the virtual chat room.

3. The computer storage media of claim 2 wherein the step of facilitating communication further includes instructions for performing steps comprising:

providing each of the plurality of individuals an indication as to the identity of each of the plurality of individuals to which the alarm event notification has been sent.

4. The computer storage media of claim 1 wherein the step of facilitating communication between the plurality of individuals within the virtual chat room further includes instructions for performing steps comprising:

recognizing an indication from at least one of the plurality of individuals confirming at least one of an emergency and a false alarm;

placing at least one third party into the virtual chat room;

facilitating communication between the plurality of individuals and the at least one third party.

5. The computer storage media of claim 4 wherein the at least one third party comprises at least one of a central station agent, security service, a 911 center, emergency first responder, and a plumber.

6. The computer storage media of claim 4 wherein the step of facilitating communication between the plurality of individuals and the at least one third party further includes instructions for performing steps comprising:

initiating communication between at least one of the plurality of individuals and at least one third party through a second communication other than within the virtual chat room.

7. The computer storage media of claim 6 wherein the second communication comprises a telephone communication.

8. The computer storage media of claim 1 wherein the step of sending an alarm event notification may comprise any one of telephone communication, instant messaging communication, texting communication and email communication.

9. A method of providing notification of an alarm event to a plurality of individuals and communication therebetween comprising the steps of:

receiving an alarm event signal from an alarm system indicative of an alarm event out of a plurality of possible alarm events;

determining a customer associated with the alarm event;

determine a plurality of individuals that are to be contacted based upon the customer that has been determined as being associated with the alarm event;

selecting a transmission vector having a corresponding transmission identifier from a plurality of available transmission vectors each having a corresponding transmission identifier;

correspondingly associating the selected transmission identifier with the alarm event;

sending an alarm event notification to each of the plurality of individuals the at least one individual utilizing the selected transmission vector;

awaiting and receiving a response to the alarm event notification on the selected transmission vector and automatically associating information of the alarm event with the response based on the response being received on the selected transmission vector which has been correspondingly associated with the alarm event;

directing each of the plurality of individuals into a virtual chat room corresponding to the alarm event; and facilitating communication between the plurality of individuals within the virtual chat room, to, in turn, facilitate the resolution of the alarm event.

10. The method of claim 9 wherein the step of facilitating communication further comprises the step of:

providing each of the plurality of individuals an indication as to the ones of the plurality of individuals that have been placed within the virtual chat room.

11. The method of claim 10 wherein the step of facilitating communication further comprises the step of:

providing each of the plurality of individuals an indication as to the identity of each of the plurality of individuals to which the alarm event notification has been sent.

12. The method of claim 9 wherein the step of facilitating communication between the plurality of individuals within the virtual chat room further includes the steps of:

recognizing an indication from at least one of the plurality of individuals confirming at least one of an emergency and a false alarm;

placing at least one third party into the virtual chat room; and facilitating communication between the plurality of individuals and the at least one third party.

13. The method of claim 12 wherein the at least one third party comprises at least one of a central station agent, security service, a 911 center, emergency first responder, and a plumber.

14. The method of claim 12 wherein the step of facilitating communication between the plurality of individuals and the at least one third party further includes the step of:

initiating communication between at least one of the plurality of individuals and at least one third party through a second communication other than within the virtual chat room.

15. The method of claim 14 wherein the second communication comprises a telephone communication.

16. The method of claim 9 wherein the step of sending an alarm event notification may comprise any one of telephone communication, instant messaging communication, texting communication and email communication.

17. An alarm operational system comprising:
- an alarm system positioned at a first location, the alarm system having a control module, a communication module coupled to the control module and at least one sensor coupled to the control module and configured to be triggered upon sensing a predetermined condition, with the communication module configured to transmit an alarm event signal when the at least one sensor is triggered; and
- a central monitoring station control system located at a second location remote from the first location, the central monitoring station positionable in communication with the communication module so as to receive the transmitted alarm event signal from the alarm system indicative of an alarm event out of a plurality of possible alarm events, the central monitoring station including:
  - a determination component for determining a customer associated with the received alarm event and for determining at least a plurality of individuals that are to be contacted based upon the customer that has been determined as being associated with the alarm event;
  - a selection component for selecting a transmission vector having a corresponding transmission identifier from a plurality of available transmission vectors each having a corresponding transmission identifier;
  - an associating component for correspondingly associating the selected transmission identifier with the alarm event;
  - a sending component for sending an alarm event notification to the plurality of individuals utilizing the selected transmission vector;
  - a receiving component for awaiting and receiving a response to the alarm event notification on the selected transmission vector and automatically associating information of the alarm event with the response based on the response being received on the selected transmission vector which has been correspondingly associated with the alarm event;
  - a directing component for directing each of the plurality of individuals into a virtual chat room corresponding to the alarm event; and
  - a communication component for facilitating communication between the plurality of individuals within the virtual chat room, to, in turn, facilitate the resolution of the alarm event.

18. The alarm operational system of claim 17 wherein the alarm system includes a plurality of sensors, each of the sensors coupled to the control module.

19. The alarm operational system of claim 17 wherein central monitoring station control system further includes:
- a second communication component for initiating communication between at least one of the plurality of individuals and at least one third party through a second communication other than within the virtual chat room.

20. The alarm operational system of claim 19 wherein the at least one third party comprises at least one of a central station agent, security service, a 911 center, emergency first responder, and a plumber.

* * * * *